No. 671,039. Patented Apr. 2, 1901.
G. E. WOOD.
SCREW DRIVER, &c.
(Application filed Oct. 2, 1900.)
(No Model.)
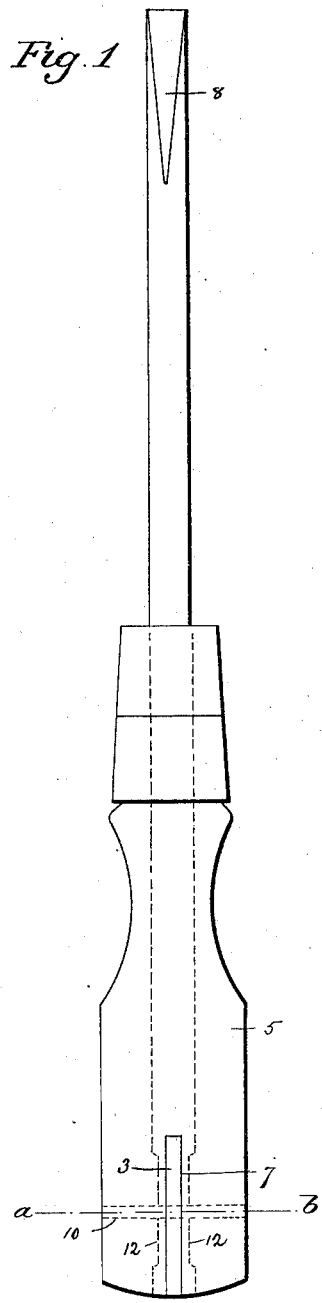
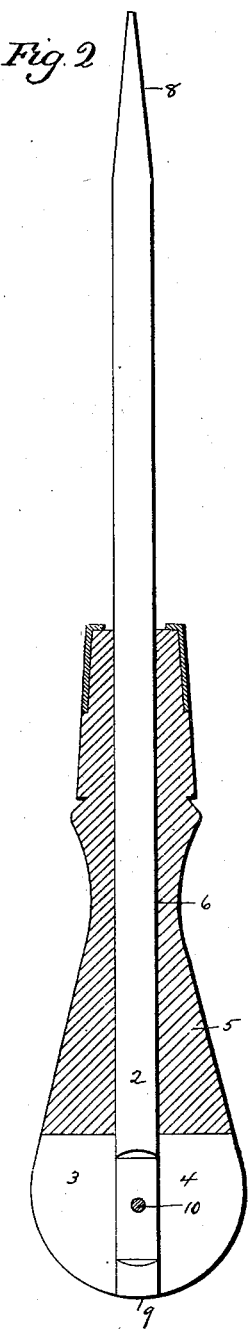
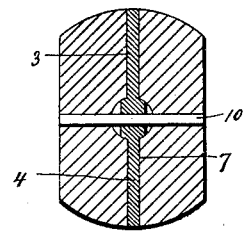
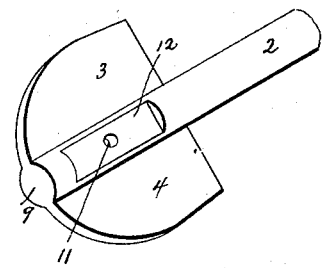
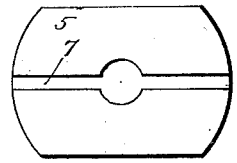

UNITED STATES PATENT OFFICE.

GEORGE E. WOOD, OF SOUTHINGTON, CONNECTICUT, ASSIGNOR TO THE ACME MANUFACTURING COMPANY, OF SAME PLACE.

SCREW-DRIVER, &c.

SPECIFICATION forming part of Letters Patent No. 671,039, dated April 2, 1901.

Application filed October 2, 1900. Serial No. 31,780. (No model.)

*To all whom it may concern:*

Be it known that I, GEORGE E. WOOD, of Southington, in the county of Hartford and State of Connecticut, have invented a new Improvement in Screw-Drivers or Kindred Tools; and I do hereby declare the following, when taken in connection with the accompanying drawings, and the characters of reference marked thereon, to be a full, clear, and exact description of the same, and which said drawings constitute part of this specification, and represent, in—

Figure 1, an edge view in elevation of a screw-driver constructed in accordance with my invention; Fig. 2, a view thereof in longitudinal section, the tool being turned to present a handle flatwise; Fig. 3, a view in transverse section on the line *a b* of Fig. 1; Fig. 4, a detached perspective view of the outer end of the shank of the tool; Fig. 5, a detached plan view of the outer end of the handle, showing the slot formed therein for the reception of the wings of the metal shank.

My invention relates to an improvement in screw-drivers and that class of kindred tools having a metal shank and wooden handle, the object being to provide simple, convenient, and inexpensive means for preventing the rotation of the shank in the handle and the splitting or bruising of the handle when the same is struck an endwise blow.

With these ends in view my invention consists in a screw-driver or kindred tool having its metal shank provided with integral wing-like extensions located at its handle end and extending laterally into the handle to prevent the rotation of the shank therein.

My invention further consists in certain details of construction and combinations of parts, as will be hereinafter described, and pointed out in the claims.

I have shown the application of my invention to the construction of screw-drivers, for which it is primarily designed, though applicable for use in other tools of a kindred nature, such as chisels.

In carrying out my invention, as shown, I form the outer end of the rod-like metal shank 2 of the screw-driver with two corresponding oppositely-extending integral wings 3 and 4, having their outer edges curved to conform to the curvature of the knob-like outer end of the wooden handle 5, which is of the ordinary form and traversed from end to end by a central longitudinal bore or passage 6 for the shank 2. The said outer end of the handle is formed with a deep transverse slot 7, intersecting the outer end of the bore or passage 6 and receiving the said wings 3 and 4, which entirely fill the slot, so as to expose their edges, which are therefore flush with the exterior surface of the end of the handle. These wings perform the twofold function of preventing the shank 2 from rotating in the handle and the further function of preventing the handle from being bruised or split by a blow upon its end with a hammer or other corresponding tool, for it is frequently necessary in using a screw-driver to strike it a blow upon its handle end in order to drive the flattened end 8 of its shank into the slot in the screw being operated upon either for the purpose of clearing the slot out or for entering the end of the driver in a slot which has been bruised. The blow upon the screw-driver thus struck may fall upon the extreme outer end 9 of the shank or both upon that point and upon the exposed edges of the wings 3 and 4. As shown, the shank is prevented from longitudinal displacement in the handle by means of a pin 10 passing through the handle and through the outer end of the shank 2, which is thereto formed with a transverse hole 11. As shown also, the outer end of the shank 2 is recessed on each side, as at 12; but this is an incident of construction and not necessary.

In carrying out my invention the shape of the wings and the shape of the handle may be changed according to the character and size and design of the tool. I would therefore have it understood that I do not limit myself to the exact construction herein shown, but hold myself at liberty to make such variations therefrom as fairly fall within the spirit and scope of my invention.

Having fully described my invention, what I claim as new, and desire to secure by Letters Patent, is—

1. In a screw-driver or kindred tool, the combination with a metal shank having its handle end formed with one or more integral, laterally-extending wings, of a wooden handle formed with a central longitudinal bore or passage for the said shank, and with a transverse slot located in its outer end, and intersecting the outer end of the said bore or passage, and receiving the wing or wings of the shank.

2. In a screw-driver or kindred tool, the combination with a metal shank provided at its handle end with two oppositely-extending integral wings having their outer edges curved, of a wooden handle formed with a central longitudinal bore or passage for the reception of the said shank, and with a transverse slot located in its outer end, and intersecting the outer end of the said bore or passage, and receiving the said wings, the curved outer edges of which are flush with the outer surface of the outer end of the handle.

3. In a screw-driver or kindred tool, the combination with a metal shank having its handle end formed with one or more integral, laterally-extending wings, of a wooden handle formed with a central longitudinal bore or passage for the said shank, and with a transverse slot located in its outer end, and intersecting the outer end of the said bore or passage, and receiving the wing or wings of the shank, and means for positively holding the shank against endwise displacement in the handle.

In testimony whereof I have signed this specification in the presence of two subscribing witnesses.

GEORGE E. WOOD.

Witnesses:
EDWIN G. LEWIS,
ROY P. NEWELL.